United States Patent
Lee et al.

(10) Patent No.: US 10,198,649 B2
(45) Date of Patent: Feb. 5, 2019

(54) ELECTRONIC PEN DEVICE HAVING OPTICAL ZOOM

(71) Applicant: SAMSUNG ELECTRONICS CO., LTD., Suwon-si (KR)

(72) Inventors: Sanghun Lee, Seoul (KR); Seokho Song, Seoul (KR); Dongkyun Kim, Suwon-si (KR); Sunghyun Nam, Yongin-si (KR); Younghun Sung, Hwaseong-si (KR); Seokyoon Jung, Seoul (KR); Yangho Cho, Seongnam-si (KR); Byounglyong Choi, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/444,959

(22) Filed: Feb. 28, 2017

(65) Prior Publication Data

US 2017/0249522 A1    Aug. 31, 2017

(30) Foreign Application Priority Data

Feb. 29, 2016    (KR) .......................... 10-2016-0024717

(51) Int. Cl.
    *G06F 3/038*     (2013.01)
    *G06K 9/22*      (2006.01)
    *G06F 3/0354*    (2013.01)
    *H04N 5/225*     (2006.01)
    *H04N 5/232*     (2006.01)

(52) U.S. Cl.
    CPC ............. *G06K 9/222* (2013.01); *G06F 3/038* (2013.01); *G06F 3/03545* (2013.01); *H04N 5/2257* (2013.01); *H04N 5/23296* (2013.01)

(58) Field of Classification Search
    CPC ..... G06K 9/222; G06F 3/03545; G06F 3/038; H04N 5/2257; H04N 3/23296
    See application file for complete search history.

(56) References Cited

U.S. PATENT DOCUMENTS

| | | | |
|---|---|---|---|
| 8,803,851 B2 | 8/2014 | Lin et al. | |
| 9,074,168 B2 | 7/2015 | Maillard et al. | |
| 2013/0201162 A1* | 8/2013 | Cavilia | G06F 3/03545 345/179 |
| 2014/0028635 A1* | 1/2014 | Krah | G06F 3/041 345/179 |
| 2014/0160080 A1* | 6/2014 | Craft | G06F 3/0317 345/175 |
| 2016/0252982 A1* | 9/2016 | Arends | G01N 21/4738 345/179 |

FOREIGN PATENT DOCUMENTS

| | | |
|---|---|---|
| KR | 100461769 B1 | 12/2004 |
| KR | 101167618 B1 | 7/2012 |

* cited by examiner

*Primary Examiner* — Carolyn R Edwards
(74) *Attorney, Agent, or Firm* — Sughrue Mion, PLLC

(57) ABSTRACT

The electric pen device includes an optical system including a lens and an image sensor configured to convert an image signal of light that has passed through the optical system to an electrical signal. The electric pen device includes a control board configured to interact with an electronic device and a communication module configured to communicate by wire or wirelessly with the electronic device, so that an image or a picture taken by a camera is confirmed and an optical zoom is controlled from the external electronic device.

10 Claims, 8 Drawing Sheets

ELECTRONIC PEN DEVICE HAVING OPTICAL ZOOM

CROSS-REFERENCE TO RELATED APPLICATION

This application claims priority from Korean Patent Application No. 10-2016-0024717, filed on Feb. 29, 2016 in the Korean Intellectual Property Office, the disclosure of which is incorporated herein in its entirety by reference.

BACKGROUND

1. Field

Apparatuses and methods consistent with exemplary embodiments relate to electric pen devices configured to be mounted on electronic devices, such as smart phones and to have an optical zoom function used in a wired or wireless method with electronic devices.

2. Description of the Related Art

Generally, a camera for taking an image or a picture is mounted in electronic devices, such as smart phones.

An optical zooming function for enlarging or reducing an image or a picture obtained through a camera is included in the electronic device. Examples of a zooming function may be a digital zooming function and an optical zooming function. When the digital zoom is used, the same result as enlarging an image or a picture may be obtained by using a program in a smart device. However, the quality of the image or the picture may be reduced. The optical zoom may perform a function of optically enlarging or reducing an image or a picture by using a lens array. The optical zoom generally provides a relatively higher image quality than the digital zoom. However, in order to realize the optical zoom, a space for mounting an additional lens module is needed, and, thus, a thickness of the smart phone is increased.

SUMMARY

Exemplary embodiments address at least the above problems and/or disadvantages and other disadvantages not described above. Also, the exemplary embodiments are not required to overcome the disadvantages described above, and may not overcome any of the problems described above.

One or more exemplary embodiments may provide electric pen devices having a camera including an optical zooming function.

One or more exemplary embodiments provide electric pen devices configured to be operated by a wireless method with electronic devices by including a battery therein.

According to an aspect of an exemplary embodiment, an electric pen device having an optical zooming function and mounted and used in an electronic device, includes: an optical system including a plurality of lenses, and an image sensor configured to convert an image signal of light that has passed through the optical system to an electrical signal.

The electric pen device may further include a control key inside a housing or a cover of the electric pen device to control an optical zoom of the optical system.

The optical system and the image sensor may be formed on a first region of the electric pen device, and a light entering unit through which external light enters the electric pen device may be formed on an edge of the first region.

The electric pen device may further include a controller on a second region of the electric pen device.

The controller may include a control board configured to detect a location and pressure of the electric pen device.

The controller may include a communication module configured to communicate with the electronic device so that images or pictures taken by the optical system and the image sensor are conformed and the optical zoom is controlled from an external electronic device.

The electric pen device may further include a battery mounted in the electric pen device.

The electric pen device may communicate with the electronic device by wireless.

The optical system may further include an optical path conversion unit by which an optical path of external light entered the electric pen device is converted.

The optical path conversion unit may include a prism or a mirror.

The electronic device may include a smart phone, a notebook, or a monitor.

BRIEF DESCRIPTION OF THE DRAWINGS

The above and/or other aspects will be more apparent by describing certain exemplary embodiments with reference to the accompanying drawings, in which.

DETAILED DESCRIPTION

Figure 1:
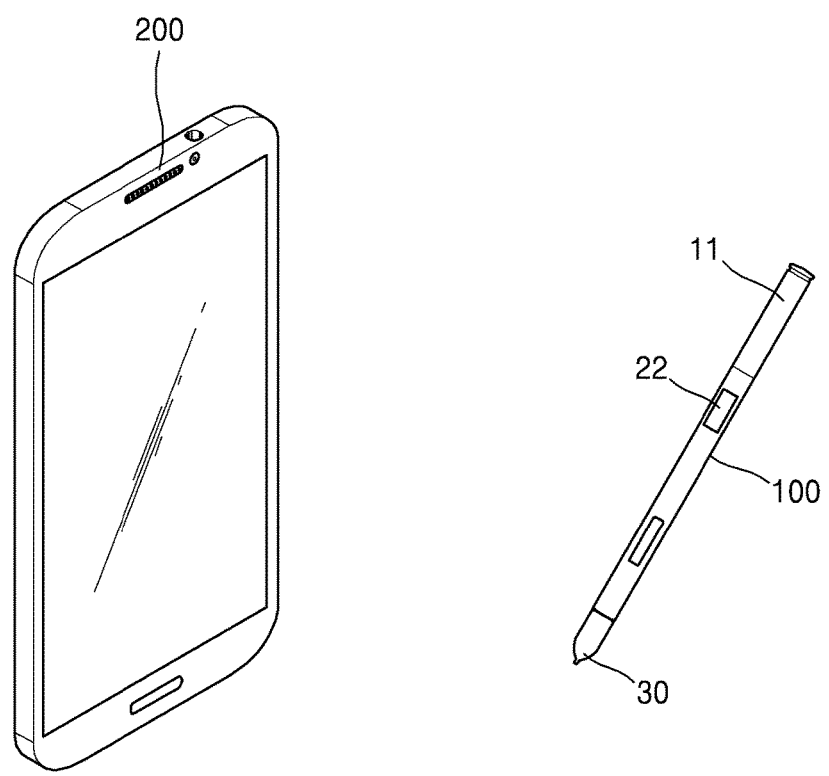
FIG. 1 is a schematic diagram of an electric pen device having an optical zooming function and an electronic device according to an exemplary embodiment.

Certain exemplary embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions are not described in detail since they would obscure the description with unnecessary detail.

Also, the exemplary embodiments are capable of various modifications and may be embodied in many different forms. It will be understood that, in layer structures described below, when an element or layer is referred to as being "on" or "above" another element or layer may include an element or a layer directly or indirectly on the other element or layer.

FIG. 1 is a schematic diagram of an electric pen device 100 having an optical zooming function and an electronic device 200 according to an exemplary embodiment.

Referring to FIG. 1, the electric pen device 100 according to an exemplary embodiment may be used in the electronic device 200, such as a smart phone and may input information to the electronic device 200 or transmit a command to the electronic device 200 so that the electronic device performs a desired function. The electric pen device 100 having a zooming function according to an exemplary embodiment may include a camera 11 having an optical system and an image sensor that detects an image from the camera 11. The electric pen device 100 may also include a control key 22 on a surface of the electric pen device 100 so that a user arbitrarily controls an optical zoom of the electric pen device 100. The optical zoom of the electric pen device 100 having an optical zooming function may be controlled via the control key 22, and may also be controlled by an electrical signal of the electronic device 200.

A process of inputting information or transmitting a command to the electronic device 200 may be performed by contacting a lower end portion 30 of the electric pen device 100 or applying pressure to a display of the electronic device 200. However, the process is not limited thereto.

Figure 2:
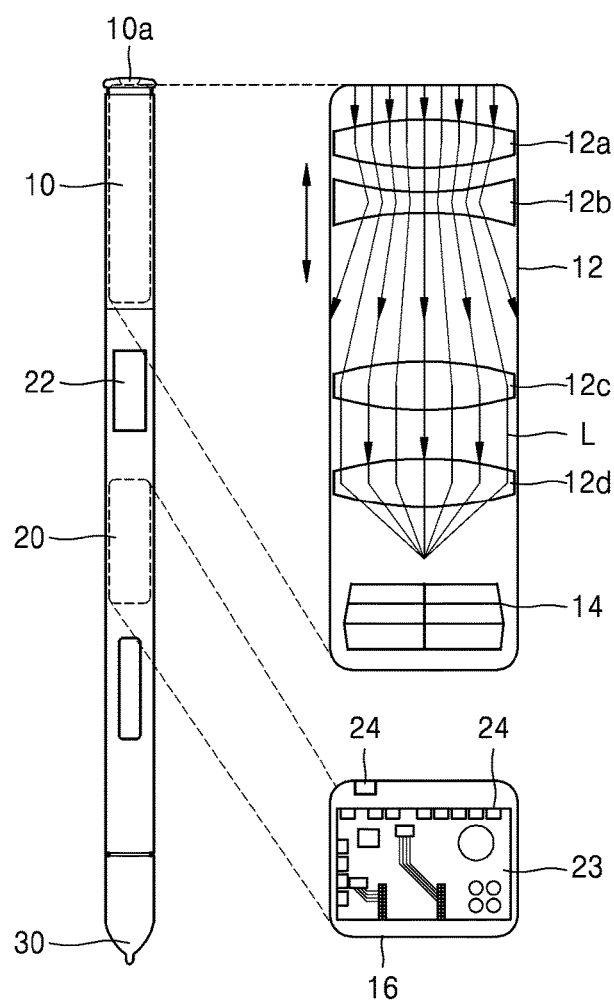
FIG. 2 is a schematic diagram of an electric pen device having an optical zooming function according to an exemplary embodiment.

FIG. 2 is a schematic diagram of the electric pen device 100 having an optical zooming function according to an exemplary embodiment.

Referring to FIGS. 1 and 2, the electric pen device 100 having an optical zooming function may include a camera 11 including an optical system 12 and an image sensor 14 inside a housing or a cover of the first region 10 and a controller 16 on a second region 20 of the electric pen device 100. Also, a control key 22 having a button shape may be provided on a surface of the electric pen device 100 so that the user arbitrarily controls an optical zoom of the optical system 12.

The optical system 12 may include at least one lens or a plurality of lenses 12a, 12b, 12c, and 12d on the first region 10 of the electric pen device 100 to pass external light L that enters through an optical entering unit 10a that is formed through a housing or a cover of the electric pen device 100, e.g., a light entering region which is formed at the end portion close to the first region 10. The number, type, and arrangement of a lens set that includes an optical zoom that constitutes the optical system 12, that is, the lenses 12a, 12b, 12c, and 12d, are not limited, and any number, type, and arrangement of lenses that may perform an optical zooming function may be used. Also, the image sensor 14 that transforms an image signal of the light L that passed through the optical system 12 to an electrical signal may be included in the first region 10 of the electric pen device 100 together with the optical system 12. The optical system 12 and the image sensor 14 mounted in the first region 10 of the electric pen device 100 having an optical zooming function according to an exemplary embodiment may be included into a camera 11.

The controller 16 may be in the second region 20 of the electric pen device 100 according to an exemplary embodiment. The controller 16 may include a control board 23 and communication module 24, e.g., a communication processor and/or communication interface, mounted inside a housing or a cover of the second region 20 of the electric pen device 100.

In detail, the controller 16 may include a terminal, that is, a control board 23 that interacts with the electronic device 200 to input information to the electronic device 200 or to transmit a command to the electronic device 200 to perform a desired function by detecting a location and pressure of the electric pen device 100. Also, the control board 23 and the communication module 24 that performs wired or wireless communication with the electronic device 200 may be included in the controller 16, in order to confirm images and pictures taken by the camera 11 with an external electronic device and to control the optical zoom in the electronic device 200. The communication module may be mounted in the controller 16 together with the control board, or may be disposed on the control board.

A housing or a cover that constitutes an appearance of the electric pen device 100 according to an exemplary embodiment may include a generally used material, for example, an insulating material, such as plastic. In the electric pen device 100 according to an exemplary embodiment, the first region 10 may be a region opposite to a lower region 30 configured to input information or transmit a command to the electronic device 200 by contacting or applying pressure to the electronic device 200 through the electric pen device 100. The second region 20 may be between the first region 10 and the lower region 30 of the electric pen device 100.

Figure 3:
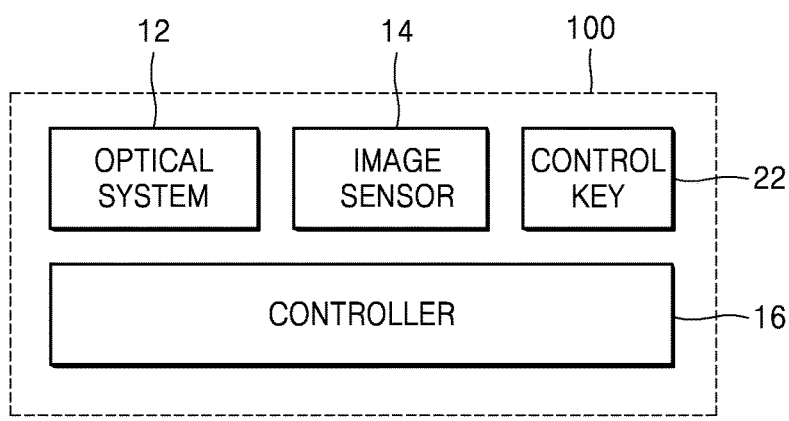
FIG. 3 is a block diagram of a configuration of an electric pen device according to an exemplary embodiment.

FIG. 3 is a block diagram of a configuration of the electric pen device 100 according to an exemplary embodiment.

Referring to FIG. 3, the electric pen device 100 according to an exemplary embodiment may include a camera 11 that includes the optical system 12 and the image sensor 14 mounted inside of the housing or the cover of the electric pen device 100. The electric pen device 100 may include the control key 22 having a button shape on a surface of the housing or the cover thereof. Through the control key 22, a zooming function may be controlled by directly controlling distances between the lenses 12a, 12b, 12c, and 12d that constitute the optical system 12 of the electric pen device 100 depicted in FIG. 2. Also, the electric pen device 100 may include the controller 16.

Figure 4A:
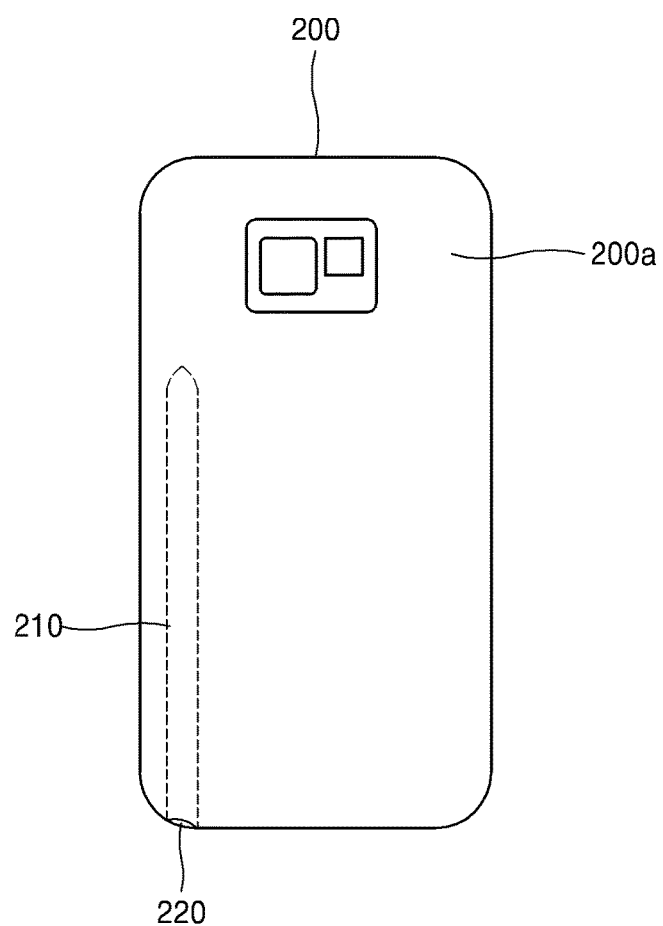
FIGS. 4A and 4B are schematic diagrams showing a coupling of an electric pen device having an optical zooming function with a smart device, according to an exemplary embodiment.
Figure 4B:
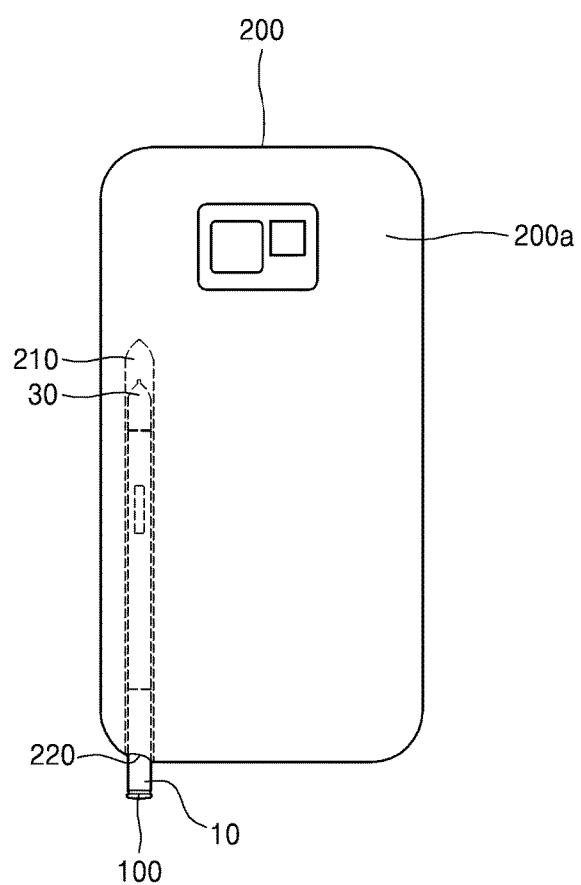

FIGS. 4A and 4B are schematic diagrams showing a coupling of the electric pen device 100 having an optical zooming function with a smart device, according to an exemplary embodiment.

The electric pen device 100 according to an exemplary embodiment may be used by being mounted on electronic devices, such as smart phones, notebooks, or monitors, may input information or transmit a command to the electronic devices, and may include a camera 11 having a zooming function.

Referring to FIGS. 1 and 4A, the electronic device 200, such as a smart phone, a notebook, or a monitor, may include an electric pen mounting unit 210, in which the electric pen device 100 according to an exemplary embodiment is mounted. A length and a width of the electric pen mounting unit 210 may be formed to a size corresponding to the length and the width of the electric pen device 100 according to an exemplary embodiment, and an opening 220 may be provided in the electric pen mounting unit 210 so that an end portion 30 of the electric pen device 100 is inserted therein.

Referring to FIGS. 4A and 4B, in order to mount the electric pen device 100 according to an exemplary embodiment in the electric pen mounting unit 210 of the electronic device 200, after inserting an end portion 30 of the electric pen device 100 in the electric pen mounting unit 210 through the opening 220, the whole body of the electric pen device 100 may be pushed into the electric pen mounting unit 210.

In a mounting state of the electric pen device 100 in the electronic device 200, the first region 10 of the electric pen device 100 may also be completely inserted into the electric pen mounting unit 210, and only an edge of the first region 10 of the electric pen device 100 where a light entering unit 10a is formed may be exposed to the outside.

Figure 5:
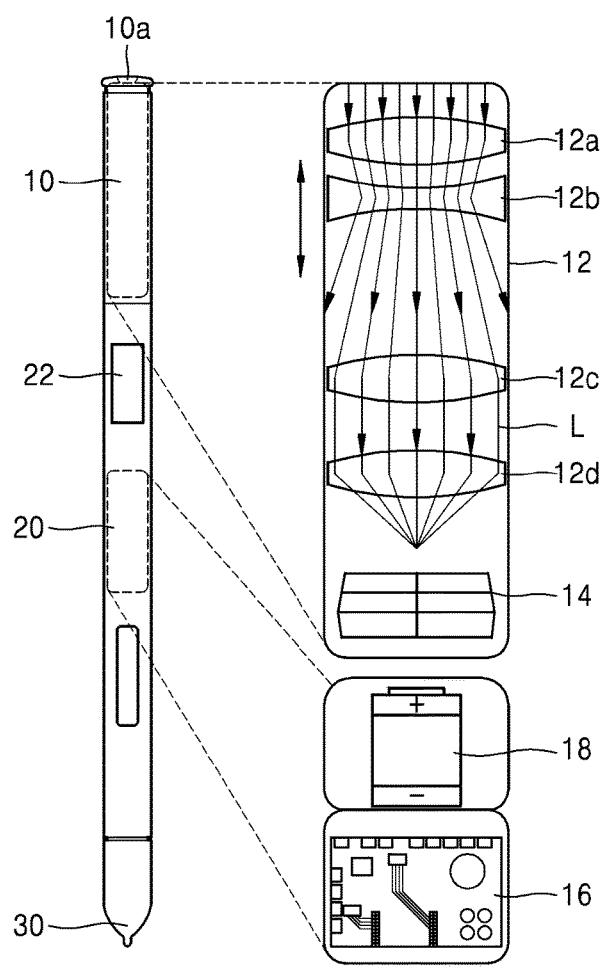
FIG. 5 is a schematic diagram of an electric pen device having an optical zooming function according to an exemplary embodiment.

FIG. 5 is a schematic diagram of an electric pen device 100 having an optical zooming function according to an exemplary embodiment.

Referring to FIGS. 1 and 5, the electric pen device 100 having an optical zooming function according to an exemplary embodiment may include a camera 11 that includes an optical system 12 and an image sensor 14 mounted inside a housing or a cover of a first region 10 of the electric pen device 100 and a controller 16 formed in a second region 20 of the electric pen device 100. Here, the electric pen device 100 having an optical zooming function according to an exemplary embodiment may further include a battery 18 between the camera 11 and the controller 16. However, the location of the battery 18 is not limited thereto, and the battery 18 may be arbitrarily on or below the controller 16.

The battery 18 may supply power to the electric pen device 100 for driving the electric pen device 100 when the electric pen device 100 according to the present exemplary embodiment is separated from the electronic device 200 and is independently used. If the electric pen device 100 is connected to the electronic device 200 via a wire, the electric pen device 100 may be operated by receiving power from the electronic device 200. Also, if the electric pen device 100 according to the present exemplary embodiment is connected to the electronic device 200 via a wire, the controller 16 may not include a wireless communication module for communicating with the electronic device 200. That is, the electric pen device 100 may receive power or commands from the electronic device 200, or may transmit image data to the electronic device 200.

Figure 6:
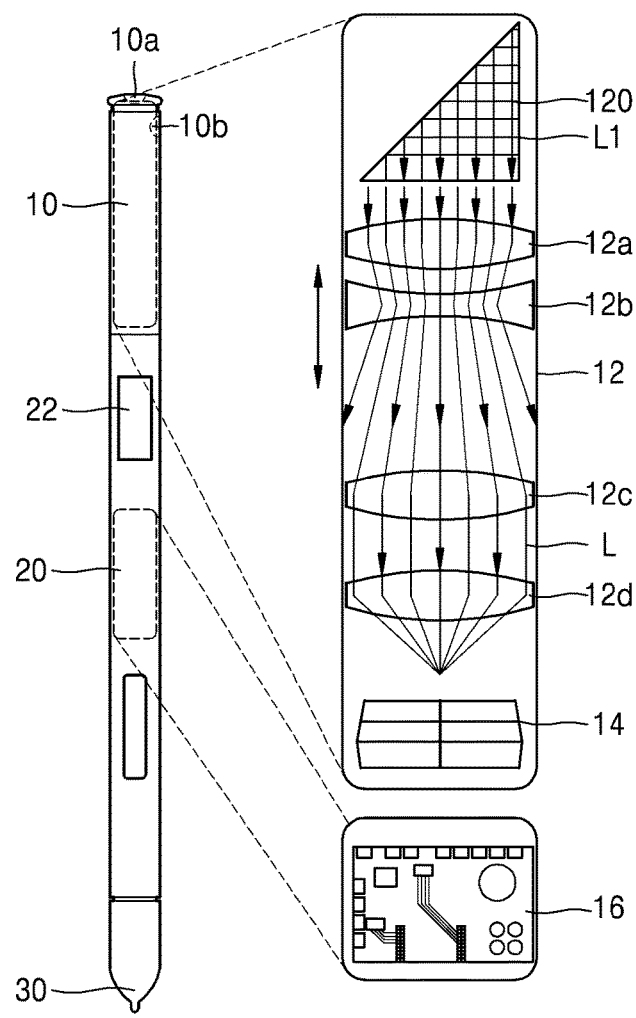
FIG. 6 is a schematic diagram of an electric pen device having an optical zooming function according to an exemplary embodiment.

FIG. 6 is a schematic diagram of an electric pen device 100 having an optical zooming function according to an exemplary embodiment.

Referring to FIGS. 1 and 6, the electric pen device 100 having an optical zooming function according to an exemplary embodiment may include a camera 11 that includes an optical system 12 and an image sensor 14 mounted inside a housing or a cover of a first region 10 of the electric pen device 100 and a controller 16 formed in a second region 20 of the electric pen device 100. Here, the optical system 12 of the electric pen device 100 having an optical zooming function may include an optical path conversion unit 120 configured to convert an optical path of external light L1 that has entered a housing or a cover of the electric pen device 100 through first and second light entering units 10a and 10b, e.g., light entering regions. External light L1 may enter the electric pen device 100 through the first light entering unit 10a or the second light entering unit 10b on a housing of the first region 10 or an end portion of the cover of the electric pen device 100. According to the locations of the first and second light entering units 10a and 10b, the optical path of the external light L1 may be converted by using the optical path conversion unit 120. For example, light entered through the first light entering unit 10a on an uppermost part of the housing or the cover of the first region 10 of the electric pen device 100 may proceed in a length direction of the electric pen device 100, that is, in an arrangement direction of lenses of the optical system 12. Also, an optical path of light entered through the second light entering unit 10b formed on a side of the housing or the cover of the first region 10 may be converted in a length direction of the electric pen device 100 through the optical path conversion unit 120. Any material, for example, a prism or a mirror that changes an optical path may be used as the optical path conversion unit 120.

The location of the first light entering unit 10a on the first region 10 of the housing or the cover of the electric pen device 100 according to the present exemplary embodiment may be changed in various ways. For example, the first light entering unit 10a may be on an uppermost part of the first region 10 of the electric pen device 100, that is, vertically above the optical system 12. In this case, as depicted in FIG. 2, the direction of light entering the optical system 12 through the light entering unit 10a from outside the electric pen device 100 may coincide with the arrangement direction of the lenses 12a, 12b, 12c, and 12d of the optical system 12 and the additional optical path conversion unit 120 may be unnecessary. However, when the first light entering unit 10a is on a side of the housing or the cover of the electric pen device 100 according to the present exemplary embodiment, the direction of light entering the optical system 12 through the light entering unit 10a from outside the electric pen device 100 may not coincide with the arrangement direction of the lenses 12a, 12b, 12c, and 12d of the optical system 12. In this case, it is necessary to change the direction of light by using the optical path conversion unit 120. Accordingly, in the electric pen device 100 according to the present exemplary embodiment, an optical path may be controlled according to the location of the light entering unit 10a by including the optical path conversion unit 120.

Figure 7:
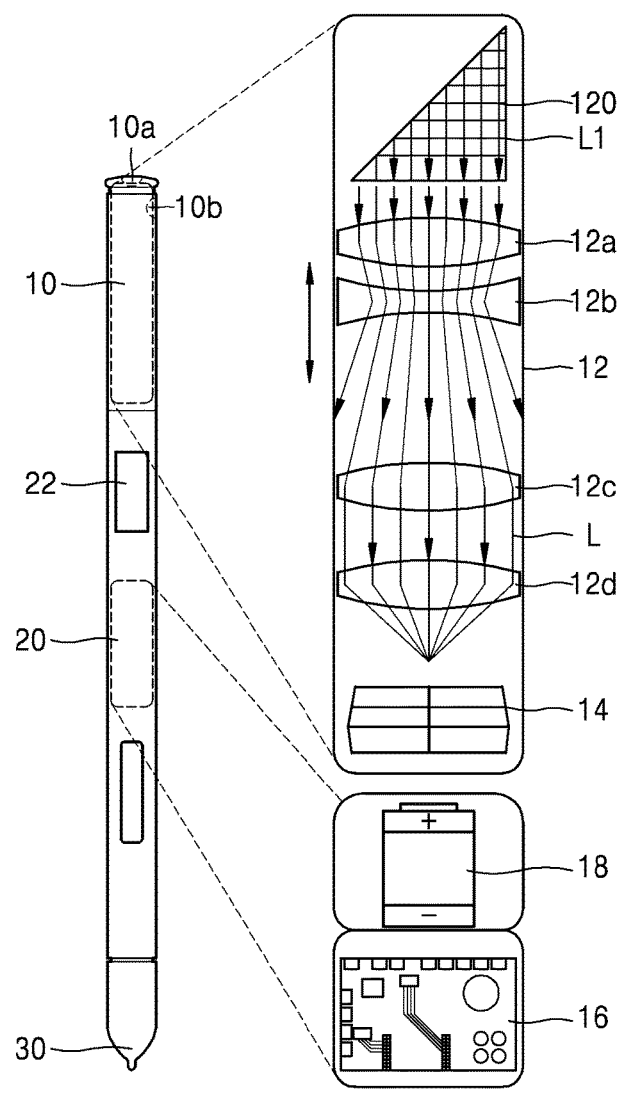
FIG. 7 is a schematic diagram of an electric pen device having an optical zooming function according to an exemplary embodiment.

FIG. 7 is a schematic diagram of an electric pen device 100 having an optical zooming function according to an exemplary embodiment.

Referring to FIGS. 1 and 7, the electric pen device 100 having an optical zooming function according to an exemplary embodiment may include a camera 11 that includes an optical system 12 and an image sensor 14 mounted inside a housing or a cover of a first region 10 of the electric pen device 100 and a controller 16 formed in a second region 20 of the electric pen device 100. Here, the optical system 12 of the electric pen device 100 having an optical zooming function may include an optical path conversion unit 120 configured to convert an optical path of external light L1 that has entered a housing or a cover of the electric pen device 100 through the light entering unit 10a.

The electric pen device 100 having an optical zooming function according to the present exemplary embodiment may further include a battery 18 between the camera 11 and the controller 16. The battery 18 may be formed on an arbitrary location, for example, below or above the controller 16. As described with reference to FIG. 5, when the electric pen device 100 according to the present exemplary embodiment is independently used by separating from the electronic device 200, the battery 18 may supply power to the electric pen device 100 for operating the electric pen device 100.

According to the exemplary embodiments, a camera 11 having a zooming function is included in an electric pen device having a pen shape that is used together with an electronic device, and a space for an optical system is additionally provided in the electronic device like a smart phone, and thus, an increase in the thickness of the electronic device may be prevented. Also, the degradation of quality of a photograph or image may be prevented, compared to a generally used digital zoom.

The foregoing exemplary embodiments and advantages are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. An electric pen device having an optical zooming function and mounted and used with an electronic device, the electric pen device comprising:
   an optical system configured to perform an optical zoom and comprising at least one lens;
   an image sensor configured to convert an image signal of light that has passed through the optical system to an electrical signal;
   a housing which houses the optical system and the image sensor;
   a control key which is disposed inside the housing or on a surface of the housing and configured to control the optical zoom of the optical system; and
   a controller comprising a communication interface configured to communicate with the electronic device,
   wherein the controller is configured to confirm, via the communication interface, images or pictures taken by the optical system and the image sensor and to control the optical zoom, by the electronic device which is a device external to the electric pen device.

2. The electric pen device of claim 1, wherein the optical system and the image sensor are disposed in a first region of the electric pen device, and a light entering region through which an external light enters the electric pen device is formed on an end portion of the first region.

3. The electric pen device of claim 1, wherein the controller is disposed in a second region of the electric pen device.

4. The electric pen device of claim 3, wherein the controller further comprises a control board configured to detect a location and a pressure of the electric pen device.

5. The electric pen device of claim 1, further comprising a battery mounted in the electric pen device.

6. The electric pen device of claim 5, wherein the electric pen device is configured to wirelessly communicate with the electronic device.

7. The electric pen device of claim 1, wherein the optical system further comprises an optical path conversion unit which is disposed on an end portion of the optical system and is configured to change an optical path of an external light that enters the electric pen device.

8. The electric pen device of claim 7, wherein the optical path conversion unit comprises a prism or a mirror.

9. The electric pen device of claim 1, wherein the electronic device comprises a smart phone, a notebook, or a monitor.

10. The electric pen device of claim 1, wherein the at least one lens is one of a plurality of lenses which are disposed one after another on a path of light between a light entering region and the image sensor.

* * * * *